United States Patent
Inoue et al.

(10) Patent No.: US 9,499,160 B2
(45) Date of Patent: Nov. 22, 2016

(54) HYBRID VEHICLE

(71) Applicant: TOYOTA JIDOSHA KABUSHIKI KAISHA, Toyota-shi, Aichi-ken (JP)

(72) Inventors: Toshio Inoue, Gotenba (JP); Shunsuke Fushiki, Susono (JP); Tomoaki Honda, Gotenba (JP); Keita Fukui, Fujinomiya (JP); Hidekazu Nawata, Gotenba (JP); Yuta Niwa, Mishima (JP); Taichi Ohsawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/722,603

(22) Filed: May 27, 2015

(65) Prior Publication Data

US 2015/0344023 A1    Dec. 3, 2015

(30) Foreign Application Priority Data

May 28, 2014    (JP) .................... 2014-110084

(51) Int. Cl.
*B60W 20/00*    (2016.01)
*F01N 3/18*    (2006.01)
*F01N 9/00*    (2006.01)

(52) U.S. Cl.
CPC .......... *B60W 20/1082* (2013.01); *B60W 20/16* (2016.01); *F01N 3/18* (2013.01); *F01N 9/00* (2013.01); *Y02T 10/47* (2013.01); *Y02T 10/6239* (2013.01); *Y02T 10/6286* (2013.01); *Y02T 10/6295* (2013.01); *Y02T 10/7005* (2013.01); *Y02T 10/7077* (2013.01); *Y10S 903/905* (2013.01)

(58) Field of Classification Search
CPC ... B60W 20/1082; B60W 20/16; F01N 9/00; F01N 3/18; Y10S 903/905; Y02T 10/7077; Y02T 10/7005; Y02T 10/6286; Y02T 10/6295; Y02T 10/6239; Y02T 10/47
See application file for complete search history.

(56) References Cited

U.S. PATENT DOCUMENTS

2012/0310458 A1*  12/2012  Nawata ............... B60K 6/445
                                                              701/22

FOREIGN PATENT DOCUMENTS

| JP | 2000-234539 | 8/2000 |
| JP | 2007-236023 | 9/2007 |
| JP | 2011-229276 | 11/2011 |
| WO | WO 2011/132054 A2 | 10/2011 |

* cited by examiner

*Primary Examiner* — Yuen Wong
(74) *Attorney, Agent, or Firm* — Finnegan, Henderson, Farabow, Garrett & Dunner, LLP

(57) ABSTRACT

A control unit for a hybrid vehicle determines whether warming of an engine is insufficient in an outside electric power feed mode. When the warming of the engine is insufficient, it is determined whether current time is in an initial period of electric power feed. When the current time is in the initial period of the electric power feed, only electric power of an electric storage device is supplied to the outside in a state that the engine is off. When the current time is not in the initial period of the electric power feed, the engine is turned on, and only electric power generated in a motor is supplied to the outside. When the warming of the engine is sufficient, the electric power generated in the motor, the electric power of the electric storage device, or both of them are supplied to the outside.

14 Claims, 10 Drawing Sheets

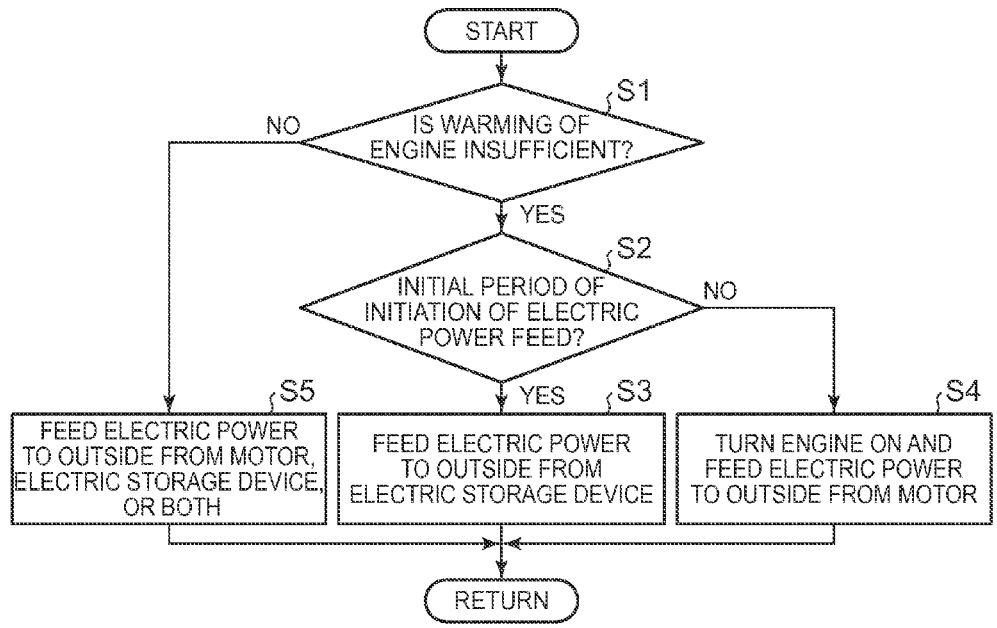
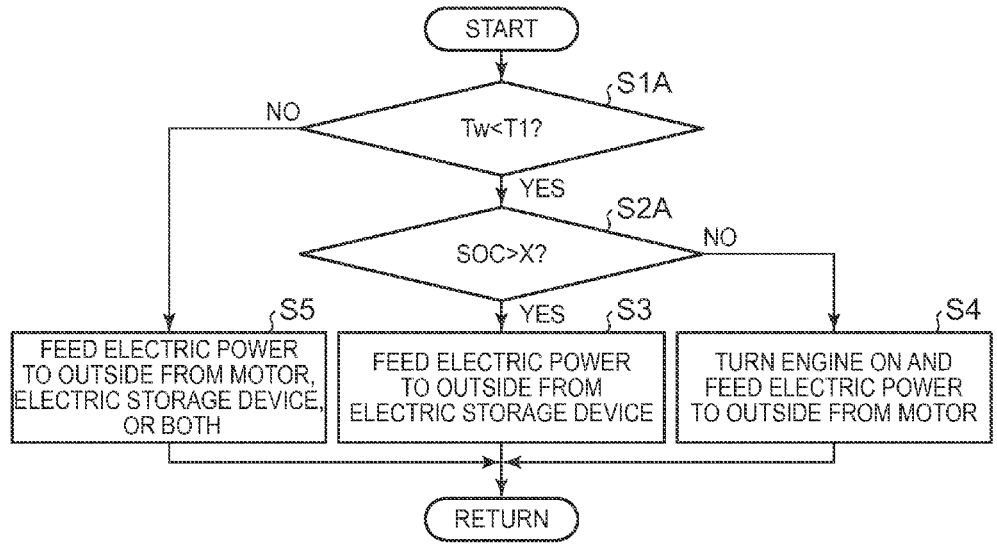

HYBRID VEHICLE

INCORPORATION BY REFERENCE

The disclosure of Japanese Patent Application No. 2014-110084 filed on May 28, 2014 including the specification, drawings and abstract is incorporated herein by reference in its entirety.

BACKGROUND OF THE INVENTION

1. Field of the Invention

The invention relates to a hybrid vehicle, and particularly to a hybrid vehicle that has an outside electric power feed mode in which electric power is supplied to the outside of the vehicle.

2. Description of Related Art

A hybrid vehicle having an outside electric power feed mode, in which electric power is supplied to the outside of the vehicle, is disclosed in Japanese Patent Application Publication No. 2000-234539 (JP 2000-234539 A). In this hybrid vehicle, in the case where a state of charge (a SOC) of a battery is equal to or larger than a specified value, the electric power of the battery is supplied to the outside of the vehicle in a state that an engine is off. On the other hand, in the case where the SOC of the battery is smaller than the specified value, the engine is turned on, the electric power generated in a motor is supplied to the outside of the vehicle, and the battery is charged. In addition, in the case where the engine is turned on, an engine speed is increased such that a catalyst is heated by exhaust gas and a temperature thereof becomes equal to or higher than an activation temperature.

SUMMARY OF THE INVENTION

In the conventional hybrid vehicle, the engine is turned off when the SOC of the battery becomes equal to or larger than the specified value. Accordingly, there is a case where the engine is cooled while the electric power of the battery is supplied to the outside of the vehicle. In the case where the SOC of the battery later becomes smaller than the specified value and the electric power is generated in the motor by turning on the engine again, the engine has been cooled, and thus an amount of exhaust emissions (an amount of contaminants in the exhaust gas) is increased.

The invention provides a hybrid vehicle that produces a small amount of exhaust emissions when electric power is fed to the outside.

A hybrid vehicle according to one aspect of the invention includes: an engine; a catalyst that purifies exhaust gas of the engine; a motor configured to be driven by the engine and generate electric power; an electric storage device configured to charge and discharge the electric power; an electric power feeder configured to supply at least one of the electric power generated by the motor or the electric power of the electric storage device to an outside of the vehicle; and at least one electronic control unit configured to a) control the engine and the electric power feeder, b) determine whether or not a purification state of the exhaust gas of the engine is insufficient, and (c) prioritize a supply of the electric power of the electric storage device to the outside of the vehicle over a supply of the electric power generated by the motor to the outside of the vehicle when the purification state of the exhaust gas of the engine is insufficient, compared to a case where the purification state of the exhaust gas of the engine is sufficient. Accordingly, if the purification state of the exhaust gas is insufficient, the supply of the electric power of the electric storage device to the outside of the vehicle is prioritized over the supply of the electric power generated in the motor to the outside of the vehicle. Thus, an amount of exhaust emissions can be reduced.

The electronic control unit may be configured to a) determine whether or not the purification state of the exhaust gas of the engine is insufficient by determining whether or not warming of the engine is insufficient, b) when the warming of the engine is insufficient, supply the electric power of the electric storage device to the outside of the vehicle while the engine is stopped, then actuate the engine, and supply the electric power generated by the motor to the outside of the vehicle, and c) when the warming of the engine is sufficient, actuate or stop the engine and supply the at least one of the electric power generated by the motor or the electric power of the electric storage device to the outside of the vehicle. In this case, if the warming of the engine is insufficient, the electric power of the electric storage device is supplied to the outside of the vehicle in the state that the engine is off. Then, the engine is turned on. Thus, the amount of the exhaust emissions can be reduced.

The electronic control unit may be configured to a) when a temperature of a coolant of the engine is lower than a predetermined temperature, determine that the warming of the engine is insufficient, and b) when the temperature of the coolant of the engine is equal to or higher than the predetermined temperature, determine that the warming of the engine is sufficient. In this case, it is possible to easily and accurately determine whether the warming of the engine is insufficient.

The electronic control unit may be configured to, in the case where the warming of the engine is insufficient, a) when an elapsed time period since an electric power supply to the outside of the vehicle is initiated is shorter than a predetermined time period, supply the electric power of the electric storage device to the outside of the vehicle while the engine is stopped, and b) when the elapsed time period is equal to or longer than the predetermined time period, actuate the engine and supply the electric power generated by the motor to the outside of the vehicle. In this case, overdischarging of the electric storage device can be prevented.

The electronic control unit may be configured to, in the case where the warming of the engine is insufficient, a) when a state of charge of the electric storage device is higher than a predetermined state of charge, supply the electric power of the electric storage device to the outside of the vehicle while the engine is stopped, and b) when the state of charge of the electric storage device is equal to or lower than the predetermined state of charge, actuate the engine and supply the electric power generated by the motor to the outside of the vehicle. In this case, the overdischarging of the electric storage device can reliably be prevented.

The electronic control unit may be configured to a) determine whether or not the purification state of the exhaust gas of the engine is insufficient by determining whether or not a purification rate of the catalyst is not sufficiently high, b) when the purification rate of the catalyst is not sufficiently high, supply the electric power of the electric storage device to the outside of the vehicle while the engine is stopped, then actuate the engine, and supply the electric power generated by the motor to the outside of the vehicle, and c) when the purification rate of the catalyst is sufficiently high, actuate or stop the engine and supply the at least one of the electric power generated by the motor or the electric power of the electric storage device to the outside of the vehicle. In this case, if the purification rate of the catalyst is not sufficiently high, the electric power of the electric storage device is supplied to the outside of the vehicle in the state that the engine is off. Then, the engine is turned on. Thus, the amount of the exhaust emissions can be reduced.

The electronic control unit may be configured to a) when a temperature of the catalyst is lower than a predetermined temperature, determine that the purification rate of the catalyst is not sufficiently high, and b) when the temperature of the catalyst is equal to or higher than the predetermined temperature, determine that the purification rate of the catalyst is sufficiently high. In this case, it is possible to easily determine whether the purification rate of the catalyst is insufficient.

The electronic control unit may be configured to change the predetermined temperature such that the predetermined temperature increases as the catalyst deteriorates. In this case, even when the catalyst is deteriorated, the amount of the exhaust emissions can be reduced.

The electronic control unit may be configured to, in the case where the purification rate of the catalyst is not sufficiently high, a) when an elapsed time period since an electric power supply to the outside of the vehicle is initiated is shorter than the predetermined time period, supply the electric power of the electric storage device to the outside of the vehicle while the engine is stopped, and b) when the elapsed time period is equal to or longer than the predetermined time period, actuate the engine and supply the electric power generated by the motor to the outside of the vehicle. In this case, the overcharging of the electric storage device can be prevented.

The electronic control unit may be configured to, in the case where the purification rate of the catalyst is not sufficiently high, a) when the state of charge of the electric storage device is higher than the predetermined state of charge, supply the electric power of the electric storage device to the outside of the vehicle while the engine is stopped, and b) when the state of charge of the electric storage device is equal to or lower than the predetermined state of charge, actuate the engine and supply the electric power generated by the motor to the outside of the vehicle. In this case, the overdischarging of the electric storage device can reliably be prevented.

The electronic control unit may be configured to, in the case where the electric power generated by the motor is supplied to the outside of the vehicle, then the engine is stopped, and the electric power of the electric storage device is supplied to the outside of the vehicle, a) when the temperature of the catalyst is lower than the predetermined temperature, actuate the engine, and supply the electric power generated by the motor to the outside of the vehicle, and b) when the temperature of the catalyst is equal to or higher than the predetermined temperature, actuate or stop the engine and supply the at least one of the electric power generated by the motor or the electric power of the electric storage device to the outside of the vehicle. In this case, when the temperature of the catalyst becomes lower than the predetermined temperature, the engine is immediately turned on, and the catalyst is heated. Thus, the amount of the exhaust emissions can be reduced.

The electronic control unit may be configured to change the predetermined temperature such that the predetermined temperature increases as the catalyst deteriorates. In this case, even when the catalyst is deteriorated, the amount of the exhaust emissions can be reduced.

The electronic control unit may be configured to, in the case where the electric power generated by the motor is supplied to the outside of the vehicle, then the engine is stopped, and the electric power of the electric storage device is supplied to the outside of the vehicle, a) when an intermittent stop period of the engine is longer than a predetermined time period, actuate the engine and supply the electric power generated by the motor to the outside of the vehicle, and b) when the intermittent stop period of the engine is equal to or shorter than the predetermined time period, actuate or stop the engine and supply the at least one of the electric power generated by the motor or the electric power of the electric storage device to the outside of the vehicle. In this case, when the intermittent stop period of the engine becomes longer and the catalyst purification rate is lowered, the engine is immediately turned on, and the catalyst is heated. Thus, the amount of the exhaust emissions can be reduced.

The electronic control unit may be configured to change the predetermined time period such that the predetermined time period reduces as the catalyst deteriorates. In this case, even when the catalyst is deteriorated, the amount of the exhaust emissions can be reduced.

As described above, according to the aspects of the invention, the amount of the exhaust emission in a period that the electric power is fed to the outside can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a flowchart for illustrating an operation of the hybrid vehicle shown in FIG. 1 in an outside electric power feed mode;

FIG. 3 is a flowchart for illustrating an operation of the hybrid vehicle according to a second embodiment of the invention in the outside electric power feed mode;

DETAILED DESCRIPTION OF EMBODIMENTS

First Embodiment

Figure 1:
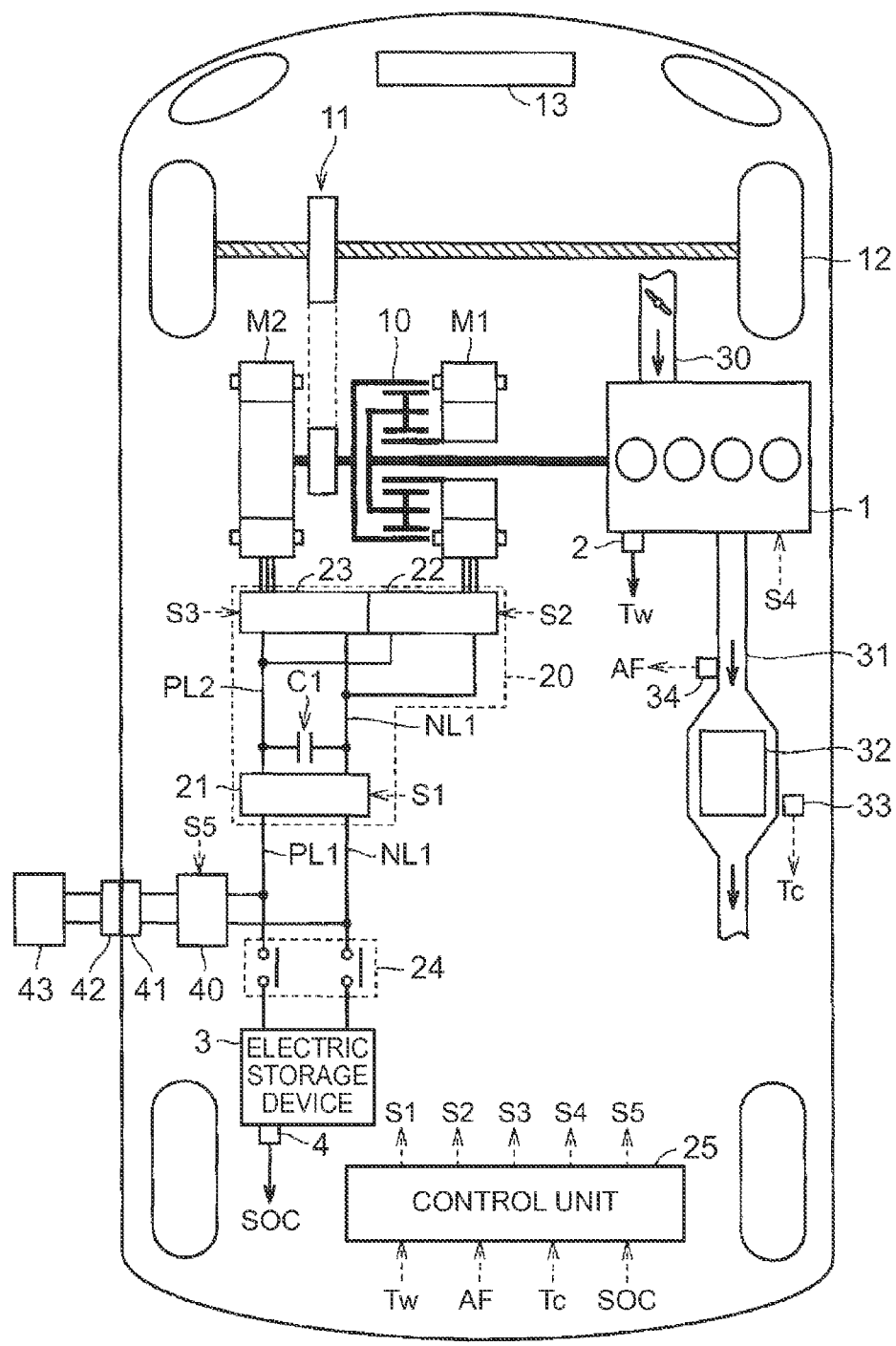
FIG. 1 is a block diagram of a configuration of a hybrid vehicle according to a first embodiment of the invention.

FIG. 1 is a block diagram of a configuration of a hybrid vehicle according to a first embodiment of the invention. In FIG. 1, this hybrid vehicle includes an engine 1, motors M1, M2, an electric storage device 3, a power dividing mechanism 10, a reducer 11, drive wheels 12, a power control unit (PCT) 20, and a control unit 25. The control unit 25 is also referred to as an electronic control unit (ECU). The invention may be implemented by using the plural ECUs.

The engine 1 is an internal combustion engine that is controlled by the control unit 25 and generates drive power for rotating a crankshaft by using combustion energy that is generated when air-fuel mixture of air and fuel suctioned into a combustion chamber is combusted. Each of the motors M1, M2 is an AC electric motor and is a three-phase AC synchronous electric motor, for example.

This hybrid vehicle travels by the drive power that is output from at least one of the engine 1 and the motor M2. The drive power generated by the engine 1 is divided into two by the power dividing mechanism 10. One of the drive power is transmitted to the drive wheel 12 via the reducer 11, and another of the drive power is transmitted to the motor M1.

In addition, when the vehicle is stopped, or when electric power is fed to the outside, the motor M1 is driven by the engine 1, and the electric power can be generated by the motor M1. The electric power generated by the motor M1 is either supplied to the electric storage device 3 and stored in the electric storage device 3 or supplied to electrical equipment 43 on the outside of the vehicle.

The power dividing mechanism 10 includes a planetary gear that is configured by including a sun gear, a pinion gear, a carrier, and a ring gear. The pinion gear is engaged with the sun gear and the ring gear. The carrier rotatably supports the pinion gear and is coupled to the crankshaft of the engine 1. The sun gear is coupled to a rotational shaft of the motor M1. The ring gear is coupled to a rotational shaft of the motor M2 and the reducer 11.

A radiator 13 for cooling a coolant that is heated by the engine 1 is provided at a front end of the vehicle. A coolant passage of the engine 1 and a coolant passage of the radiator 13 are annularly connected by a hose or the like, and the coolant is circulated in the coolant passage of the engine 1 and the coolant passage of the radiator 13. When the engine 1 is turned on, the coolant is heated by the engine 1 and then cooled by the radiator 13. In this way, a temperature of the coolant, that is, an engine coolant temperature Tw is increased. A temperature detector 2 is provided at a specified position in the engine 1. The temperature detector 2 detects the engine coolant temperature Tw and outputs a signal indicative of a detected value to the control unit 25.

The electric storage device 3 is an electric power storage element that is configured to enable charging and discharging. The electric storage device 3 is configured by including a secondary battery, such as a lithium ion battery, a nickel hydrogen battery, or a lead storage battery, or a cell of an electric storage element, such as an electric double layer capacitor, for example. A SOC detector 4 for detecting a SOC of the electric storage device 3 is connected to the electric storage device 3.

The SOC detector 4 detects the SOC of the electric storage device 3 and outputs a signal indicative of a detected value to the control unit 25. The SOC detector 4, for example, includes a voltage detector for detecting voltage between terminals of the electric storage device 3, a current detector for detecting charging current and discharging current of the electric storage device 3, a temperature detector for detecting a temperature of the electric storage device 3, and a computation section for computing the SOC of the electric storage device 3 on the basis of detected values of the three detectors and outputting a signal indicative of the computed SOC.

The electric storage device 3 is connected to the PCU 20 for driving the motors M1, M2 via a relay 24. The electric power of the electric storage device 3 is either supplied to the PCU 20 for generating the drive power of the hybrid vehicle or supplied to the electrical equipment 43 on the outside of the vehicle. Furthermore, the electric storage device 3 stores the electric power generated in the motors M1, M2. The voltage between the terminals of the electric storage device 3 is 200 V, for example.

The PCU 20 includes a converter 21, inverters 22, 23, and a capacitor C1. The converter 21 is controlled by a control signal S1 from the control unit 25 and converts a level of DC voltage between power lines PL1, NL1 and between power lines PL2, NL1.

The inverters 22, 23 are connected in parallel with respect to the power lines PL2, NL1. The inverters 22, 23 are respectively controlled by control signals S2, S3 from the control unit 25, convert DC power that is supplied from the converter 21 to AC power, and respectively drive the motors M1, M2. In addition, the inverter 22 converts the AC power that is generated in the motor M1 driven by the engine 1 to the DC power, and supplies the DC power between the power lines PL2, NL1. The capacitor C1 is connected between the power lines PL2, NL1 and stabilizes the voltage between the power lines PL2, NL1.

The engine 1 is controlled by a control signal S4 from the control unit 25. More specifically, a throttle opening degree, ignition timing, fuel injection timing, a fuel injection amount, an actuation state (opened/closed timing, a lift amount, an actuation angle, and the like) of an intake valve of the engine 1 are controlled, so as to bring the engine 1 into a desired operation state. The air is introduced into the engine 1 through an intake passage 30. Exhaust gas discharged from the engine 1 flows through an exhaust passage 31 and is discharged to the outside of the vehicle. The exhaust passage 31 is provided with a catalyst 32 for purifying the exhaust gas. The catalyst 32 is, for example, a three-way catalyst and purifies carbon monoxide (CO), hydrocarbon (HC), NOx, and PM that are contained in the exhaust gas.

The catalyst 32 is provided with a temperature detector 33 for detecting a bed temperature Tc of the catalyst 32. The temperature detector 33 outputs a detected value of the catalyst bed temperature Tc to the control unit 25. The catalyst 32 has such a characteristic that a purification rate thereof is increased in a state of being heated at a specified activation temperature. In addition, the exhaust passage 31 is provided with an air-fuel ratio detector 34 for detecting an air-fuel ratio of the exhaust gas. The air-fuel ratio detector 34 outputs a detected value of an air-fuel ratio AF of the exhaust gas to the control unit 25.

The control unit 25 controls the entire hybrid vehicle on the basis of the air-fuel ratio AF detected by the air-fuel ratio detector 34, the catalyst bed temperature Tc detected by the temperature detector 33, the engine coolant temperature Tw detected by the temperature detector 2, the SOC detected by the SOC detector 4, and the like.

Noted that, instead of using the temperature detector 33, the control unit 25 may estimate the catalyst bed temperature Tc on the basis of a parameter for controlling the engine 1. In addition, the catalyst 32 may be configured by including a front stage catalyst that is located on an upstream side of the exhaust passage 31 and a rear stage catalyst that is located on a downstream side of the exhaust passage 31. Furthermore, the air-fuel ratio detector 34 may be located on an upstream side of the front stage catalyst, may be located between the front stage catalyst and the rear stage catalyst, or may be located on a downstream side of the rear stage catalyst.

The hybrid vehicle further includes an inverter 40 and an electric power feed port 41 as a configuration for supplying the electric power to the electrical equipment 43 on the outside of the vehicle. The electric power feed port 41 is an electric power interface for supplying the electric power to the electrical equipment 43. The electric power feed port 41 is configured to be connectable to a connector 42 that is connected to the electrical equipment 43.

The inverter 40 is provided between the electric power feed port 41 and a position between the electric storage device 3 and the PCU 20. The inverter 40 is controlled by a control signal S5 from the control unit 25, converts the DC power from at least one of the electric storage device 3 and the PCU 20 to the AC power in an outside electric power feed mode, and supplies the AC power to the electrical equipment 43 via the electric power feed port 41 and the connector 42. The PCU 20, the relay 24, and the inverter 40 constitute an electric power feeder for supplying at least one of the electric power that is generated in the motor M1 and the electric power of the electric storage device 3 to the outside of the vehicle in the outside electric power feed mode.

Next, a description will be made on the outside electric power feed mode as a characteristic of the invention of the subject application. In such a hybrid vehicle, a reduction in an amount of the exhaust emissions is constantly requested. As a case of a large amount of the exhaust emissions, a first case where warming of the engine 1 is insufficient, a second case where a purification rate of the catalyst 32 is not sufficiently high, a third case where a load of the engine 1 fluctuates, and a fourth case where the load of the engine 1 exceeds an upper limit value are raised. In view of the above, in the invention of the subject application, the first and second embodiments focus on the first case, third to sixth embodiments focus on the second case, a seventh embodiment focuses on the third case, and an eighth embodiment focuses on the fourth case. In this way, the amount of the exhaust emissions is reduced.

FIG. 2 is a flowchart for illustrating an operation of the control unit 25 shown in FIG. 1 in the outside electric power feed mode. For example, the outside electric power feed mode is set when a user of the hybrid vehicle connects the connector 42, which is connected to the electrical equipment 43, to the electric power feed port 41 and then operates an outside electric power feed mode setting button (not shown).

In FIG. 2, the control unit 25 determines in step S1 whether the warming of the engine 1 is insufficient. Whether the warming of the engine 1 is insufficient may be determined on the basis of a result that is obtained by directly or indirectly detecting a temperature of the engine 1 (for example, the engine coolant temperature Tw that is detected by the temperature detector 2), may be determined on the basis of the temperature of the engine 1 that is estimated from an operation parameter of the engine 1, or may be determined on the basis of an elapsed time period since the engine 1 is turned on or off. The determination on whether the warming of the engine 1 is insufficient corresponds to a determination on whether a purification state of the exhaust gas of the engine 1 is insufficient.

If it is determined in step S1 that the warming of the engine 1 is insufficient, it is determined in step S2 whether current time is in an initial period of initiation of the electric power feed. Whether the current time is in the initial period of initiation of the electric power feed is determined, for example, on the basis of whether a time period ts that has elapsed since the outside electric power feed is initiated is shorter than a specified time period t1.

The specified time period t1 may be a constant time period, a time period that varies by an outside temperature, or a time period that varies by an electric power feed rate to the outside. When the outside electric power feed time period ts is equal to or shorter than the specified time period t1, the electric power of the electric storage device 3 does not become insufficient. Loss of the electric power of the electric storage device 3 is accelerated as the outside temperature is reduced. Thus, the specified time period t1 may be set shorter in accordance with a reduction in the outside temperature.

If it is determined in step S2 that the current time is in the initial period of the initiation of the electric power feed, the control unit 25 controls the engine 1, the PCU 20, and the relay 24 in step S3 such that only the electric power of the electric storage device 3 is supplied to the outside in a state that the engine 1 is off. Then, the process returns to step S1.

If it is determined in step 2 that the current time is not in the initial period of the initiation of the electric power feed, the control unit 25 controls the engine 1, the PCU 20, and the relay 24 in step S4 such that the engine 1 is turned on and only the electric power generated in the motor M1 is fed to the outside. Then, the process returns to step S1.

If it is determined in step S1 that the warming of the engine 1 is sufficient, the control unit 25 controls the engine 1, the PCU 20, and the relay 24 in step S5 such that at least one of the electric power that is generated in the motor M1 driven by the engine 1 and the electric power of the electric storage device 3 is supplied to the outside. Then, the process returns to step S1.

If an external load fluctuates in step S5 and the electric power generated in the motor M1 becomes excessive, an excess thereof is stored in the electric storage device 3. On the other hand, if the electric power generated in the motor M1 becomes insufficient, a shortage thereof is compensated by a supply from the electric storage device 3. If the SOC of the electric storage device 3 is sufficiently large, the engine 1 is stopped, and only the electric power of the electric storage device 3 is supplied to the outside.

In this first embodiment, if the warming of the engine 1 is insufficient, the electric power of the electric storage device 3 is supplied to the outside of the vehicle in the state that the engine 1 is off. Then, the engine 1 is turned on. In other words, if the warming of the engine 1 is insufficient, the supply of the electric power of the electric storage device 3 to the outside of the vehicle is prioritized over the supply of the electric power that is generated by turning on the engine 1 to the outside of the vehicle. Accordingly, the amount of the exhaust emissions can be reduced.

Second Embodiment

This second embodiment also focuses on a fact that the amount of the exhaust emissions is increased in the first case where the warming of the engine 1 is insufficient, so as to reduce the amount of the exhaust emissions. Whether the warming of the engine 1 is insufficient is determined on the basis of whether the engine coolant temperature Tw that is detected by the temperature detector 2 is lower than a specified temperature T1.

FIG. 3 is a flowchart for illustrating an operation of the hybrid vehicle according to the second embodiment of the invention in the outside electric power feed mode and is compared with FIG. 2. In FIG. 3, the control unit 25 determines in step S1A whether the engine coolant temperature Tw is lower than the specified temperature T1. If Tw<T1 is satisfied, the control unit 25 determines in step S2A whether the SOC of the electric storage device 3 is larger than a specified value X.

If it is determined in step S2A that SOC>X is satisfied, the control unit 25 controls the engine 1, the PCU 20, and the relay 24 in step S3 such that only the electric power of the electric storage device 3 is supplied to the outside in the state that the engine 1 is off. Then, the process returns to step S1A.

If it is determined in step S2A that SOC>X is not satisfied, the control unit 25 controls the engine 1, the PCU 20, and the relay 24 in step S4 such that the engine 1 is on and only the electric power generated in the motor M1 is fed to the outside. Then, the process returns to step S1A.

If it is determined in step S1A that Tw<T1 is not satisfied, the control unit 25 controls the engine 1, the PCU 20, and the relay 24 in step S5 such that the at least one of the electric power that is generated in the motor M1 driven by the engine 1 and the electric power of the electric storage device 3 is supplied to the outside. Then, the process returns to step S1A.

In this second embodiment, if the engine coolant temperature Tw is lower than the specified temperature T1, the electric power of the electric storage device 3 is supplied to the outside of the vehicle in the state that the engine 1 is off. Then, the engine 1 is turned on. In other words, if the engine coolant temperature Tw is lower than the specified temperature T1, that is, if the warming of the engine 1 is insufficient, the supply of the electric power of the electric storage device 3 to the outside of the vehicle is prioritized over the supply of the electric power that is generated by turning on the engine 1 to the outside of the vehicle. Thus, the amount of the exhaust emissions can be reduced.

Noted that, in this second embodiment, whether the warming of the engine 1 is insufficient is determined on the basis of whether the engine coolant temperature Tw is lower than the specified temperature T1. However, the invention is not limited thereto. The temperature of the engine 1 may directly or indirectly be detected, and it may be determined whether the warming of the engine 1 is insufficient on the basis of the detected temperature. In addition, the temperature of the engine 1 may be estimated on the basis of an operation status of the engine 1, and it may be determined whether the warming of the engine 1 is insufficient on the basis of the estimated temperature.

Furthermore, in this second embodiment, if the SOC of the electric storage device 3 is larger than the specified value X, the electric power of the electric storage device 3 is supplied to the outside. However, the invention is not limited thereto. The electric power of the electric storage device 3 may be supplied to the outside if a reduced amount ΔSOC of the SOC of the electric storage device 3 is smaller than a specified value ΔX (ΔSOC<ΔX). In the case where the SOC is 100% when the outside electric power feed is initiated, the same result can be obtained by adopting any of the methods.

Third Embodiment

Figure 4:
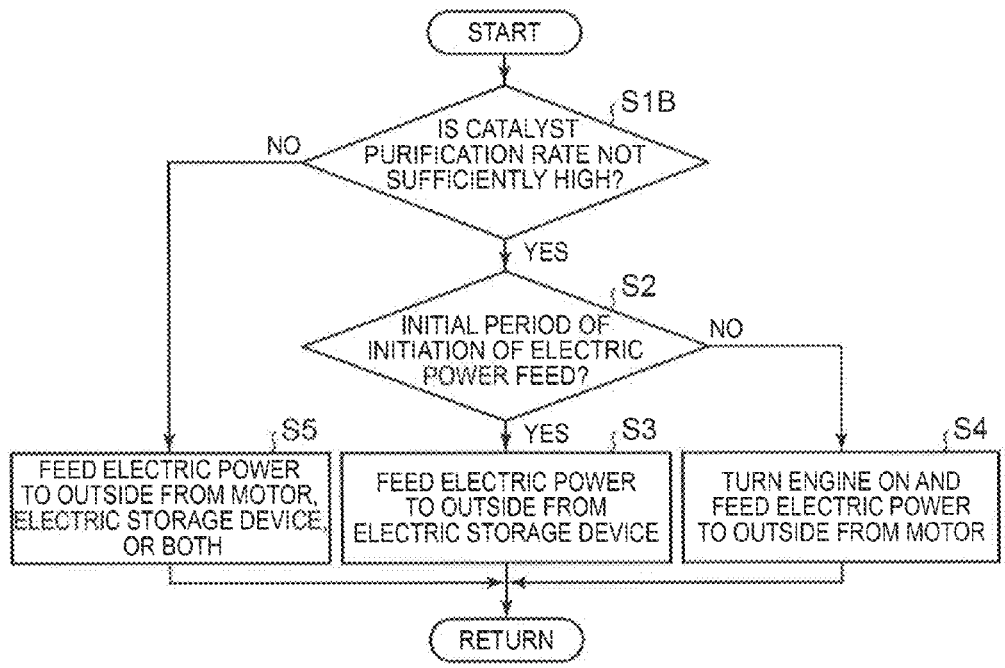
FIG. 4 is a flowchart for illustrating an operation of the hybrid vehicle according to a third embodiment of the invention in the outside electric power feed mode.

This third embodiment focuses on a fact that the amount of the exhaust emissions is increased in the second case where the purification rate of the catalyst 32 is not sufficiently high, so as to reduce the amount of the exhaust emissions. FIG. 4 is a flowchart for illustrating an operation of the hybrid vehicle according to the third embodiment in the outside electric power feed mode and is compared with FIG. 2. FIG. 4 differs from FIG. 2 in a point that step S1 is replaced by step S1B.

The control unit 25 determines in step S1B whether a catalyst purification rate is not sufficiently high. If the catalyst purification rate is not sufficiently high, the process proceeds to step S2. On the other hand, if the catalyst purification rate is sufficiently high, the process proceeds to step S5. Whether the purification rate of the catalyst 32 is not sufficiently high may be determined on the basis of a result that is obtained by directly or indirectly detecting the bed temperature Tc of the catalyst 32, or may be determined on the basis of an elapsed time period since the engine 1 is turned on or off. The determination on whether the purification rate of the catalyst 32 is not sufficiently high corresponds to a determination on whether the purification state of the exhaust gas of the engine 1 is insufficient. Since the other configurations and operations are the same as those in the first embodiment, the description thereof will not be repeated.

In this third embodiment, if the catalyst purification rate is not sufficiently high, the electric power of the electric storage device 3 is supplied to the outside of the vehicle in the state that the engine 1 is off. Then, the engine 1 is turned on. In other words, if the catalyst purification rate is not sufficiently high, the supply of the electric power of the electric storage device 3 to the outside of the vehicle is prioritized over the supply of the electric power that is generated by turning on the engine 1 to the outside of the vehicle. Thus, the amount of the exhaust emissions can be reduced.

Fourth Embodiment

This fourth embodiment also focuses on the fact that the amount of the exhaust emissions is increased in the second case where the purification rate of the catalyst 32 is not sufficiently high, so as to reduce the amount of the exhaust emissions. Whether the catalyst purification rate is not sufficiently high is determined on the basis of whether the catalyst bed temperature Tc is lower than a specified temperature T2.

Figure 5:
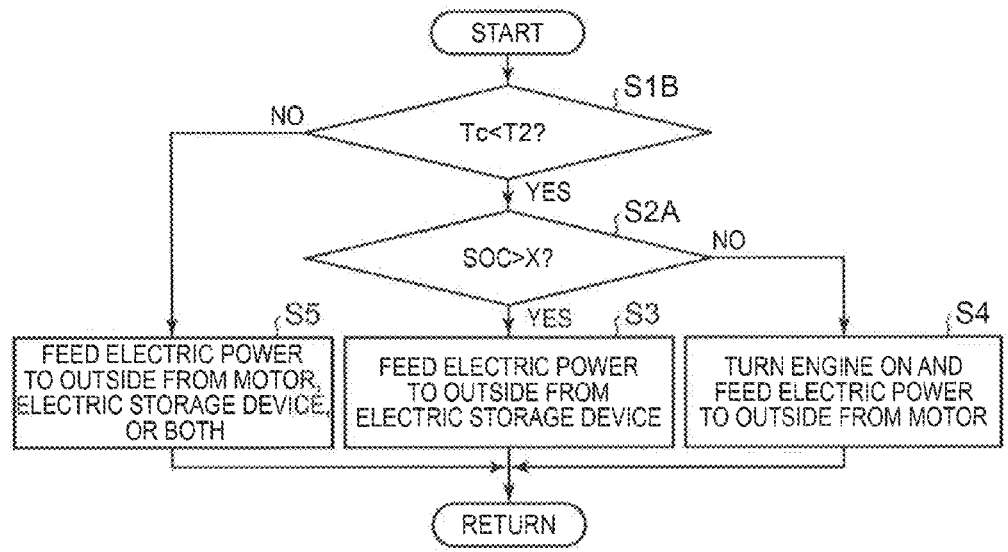
FIG. 5 is a flowchart for illustrating an operation of the hybrid vehicle according to a fourth embodiment of the invention in the outside electric power feed mode.

FIG. 5 is a flowchart for illustrating an operation of the hybrid vehicle according to the fourth embodiment of the invention in the outside electric power feed mode and is compared with FIG. 3. FIG. 5 differs from FIG. 3 in a point that step S1A is replaced by step S1B. The control unit 25 determines in step S1B whether the catalyst bed temperature Tc is lower than the specified temperature T2. If Tc<T2 is satisfied, the process proceeds to step S2A. If Tc<T2 is not satisfied, the process proceeds to step S5.

Figure 6:
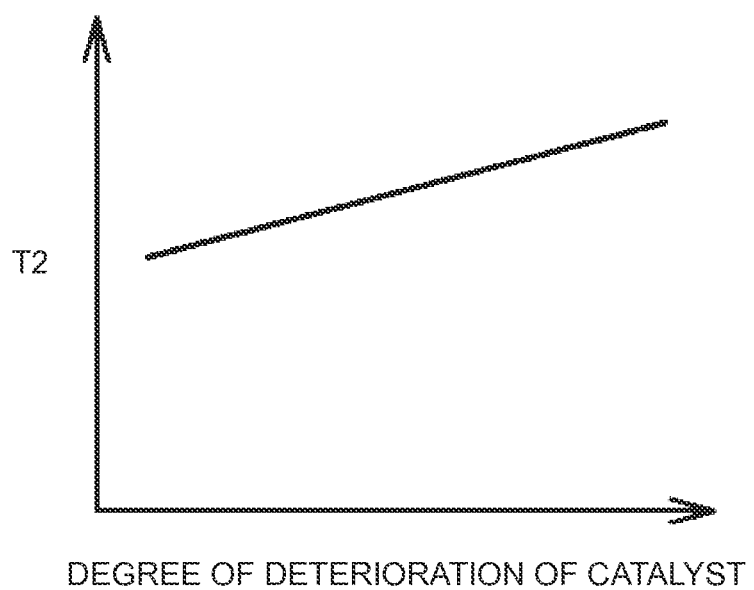
FIG. 6 is a table that indicates a relationship between a degree of deterioration of a catalyst and a specified value that are shown in FIG. 5.

The specified temperature T2 is set at the activation temperature of the catalyst 32. The catalyst 32 is activated when the catalyst bed temperature Tc becomes equal to or higher than the activation temperature, and purifies the exhaust gas. The specified temperature T2 may be a constant value, or may be increased in accordance with a degree of deterioration of the catalyst 32 as shown in FIG. 6. It is because the catalyst 32 is deteriorated in accordance with use time or the like and also because the activation temperature of the catalyst 32 is increased in accordance with the degree of deterioration of the catalyst 32. For example, the control unit 25 stores a table that indicates a relationship between total use time (that is, the degree of deterioration) of the catalyst 32 and the specified temperature T2, and reads out the specified temperature T2 that corresponds to the total use time of the catalyst 32 from the table. Since the other configurations and operations are the same as those in the second embodiment, the description thereof will not be repeated.

In this fourth embodiment, if the catalyst bed temperature Tc is lower than the specified temperature T2, the electric power of the electric storage device 3 is supplied to the outside of the vehicle in the state that the engine 1 is off. Then, the engine 1 is turned on. In other words, if the catalyst bed temperature Tc is lower than the specified temperature T2, that is, if the catalyst purification rate is not sufficiently high, the supply of the electric power of the electric storage device 3 to the outside of the vehicle is prioritized over the supply of the electric power that is generated by turning on the engine 1 to the outside of the vehicle. Thus, the amount of the exhaust emissions can be reduced.

Fifth Embodiment

Figure 7:
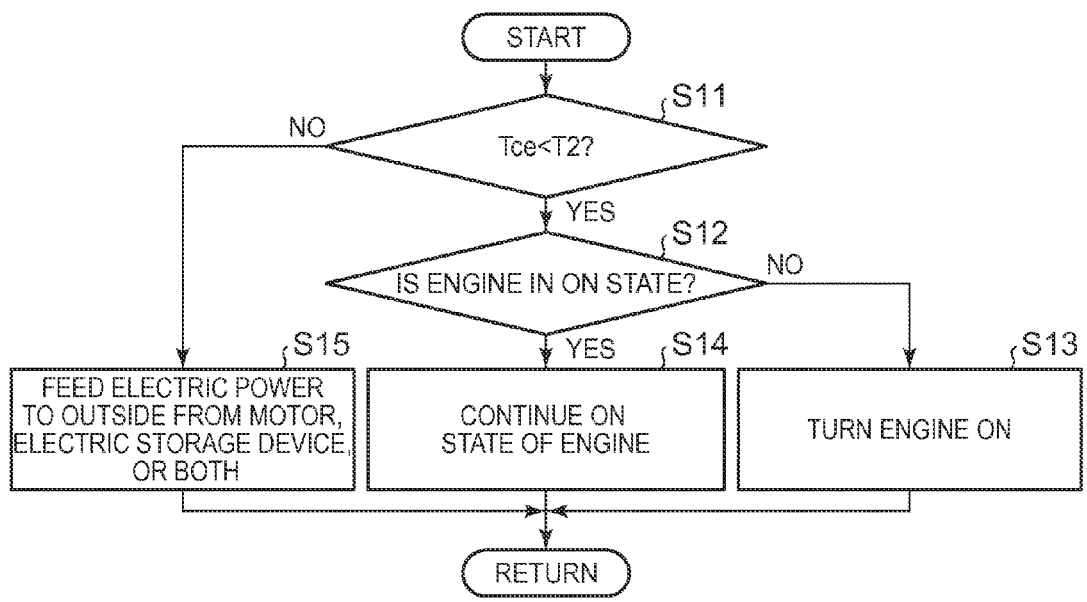
FIG. 7 is a flowchart for illustrating an operation of the hybrid vehicle according to a fifth embodiment of the invention in the outside electric power feed mode.

This fifth embodiment also focuses on a fact that the amount of the exhaust emissions is increased in the second case where the purification rate of the catalyst 32 is not sufficiently high, so as to reduce the amount of the exhaust emissions. Whether the catalyst purification rate is not sufficiently high is determined on the basis of whether an estimated catalyst bed temperature Tce is lower than the specified temperature T2. FIG. 7 is a flowchart for illustrating an operation of the hybrid vehicle according to the fifth embodiment of the invention in the outside electric power feed mode and is compared with FIG. 2.

The control unit 25 determines in step S11 of FIG. 7 whether the catalyst bed temperature Tce that is estimated on the basis of the operation status of the engine 1 (the engine speed or the like) is lower than the specified temperature T2. If Tce<T2 is satisfied, the control unit 25 determines in step S12 whether the engine 1 is in an on state. Step S11 is executed, for example, in the first embodiment, in the case where the electric power generated in the motor M1 is supplied to the outside of the vehicle, then the engine 1 is turned off, and the electric power of the electric storage device 3 is supplied to the outside of the vehicle.

The specified temperature T2 may be the constant value, or may be increased in accordance with the degree of deterioration of the catalyst 32 as shown in FIG. 6. If it is determined in step S12 that the engine 1 is not in the on state, the engine 1 is turned on in step S13. Then, the process returns to step S11. At this time, the speed of the engine 1 is set such that the catalyst bed temperature Tce becomes equal to or higher than the specified temperature T2.

If it is determined in step S12 that the engine 1 is in the on state, the on state of the engine 1 is continued in step S14. Then the process returns to step S11. If it is determined in step S11 that Tce<T2 is not satisfied, that is, if the sufficiently high purification rate of the catalyst 32 is secured, the electric power is fed to the outside from the motor M1, the electric storage device 3, or both of the motor M1 and the electric storage device 3 in step S15.

In this fifth embodiment, if the catalyst bed temperature Tce is lower than the specified temperature T2, that is, in the second case where the catalyst purification rate is not sufficiently high, the engine 1 is immediately turned on, and the catalyst 32 is heated. Thus, the amount of the exhaust emissions can be reduced.

Noted that, in this fifth embodiment, the catalyst bed temperature Tce that is estimated on the basis of the operation status of the engine 1 is used. However, the catalyst bed temperature Tc that is detected by the temperature detector 33 in FIG. 1 may be used.

Sixth Embodiment

Figure 8:
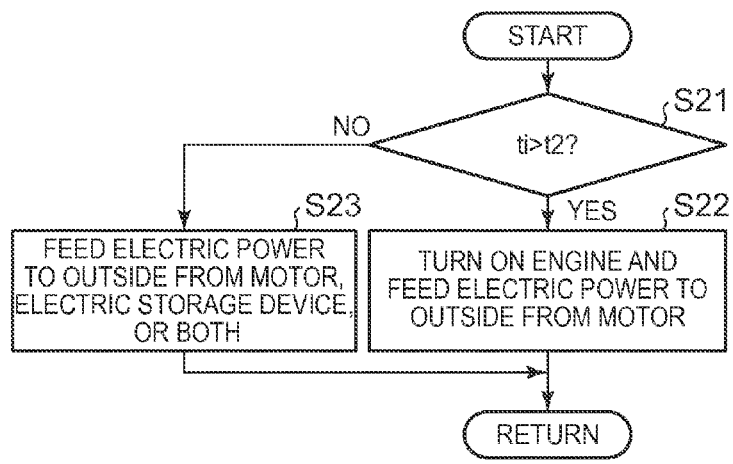
FIG. 8 is a flowchart for illustrating an operation of the hybrid vehicle according to a sixth embodiment of the invention in the outside electric power feed mode.

This sixth embodiment also focuses on the fact that the amount of the exhaust emissions is increased in the second case where the purification rate of the catalyst 32 is not sufficiently high, so as to reduce the amount of the exhaust emissions. Whether the catalyst purification rate is not sufficiently high is determined on the basis of whether an intermittent stop period ti as a time period that has elapsed since the engine 1 is stopped is longer than a specified time period t2. FIG. 8 is a flowchart for illustrating an operation of the hybrid vehicle according to the sixth embodiment of the invention in the outside electric power feed mode and is compared with FIG. 2.

The control unit 25 determines in step S21 of FIG. 8 whether the intermittent stop period ti of the engine 1 is longer than the specified time period t2. Step S21 is executed, for example, in the first embodiment in the case where the electric power generated in the motor M1 is supplied to the outside of the vehicle, then the engine 1 is turned off, and the electric power of the electric storage device 3 is supplied to the outside of the vehicle.

Figure 9:
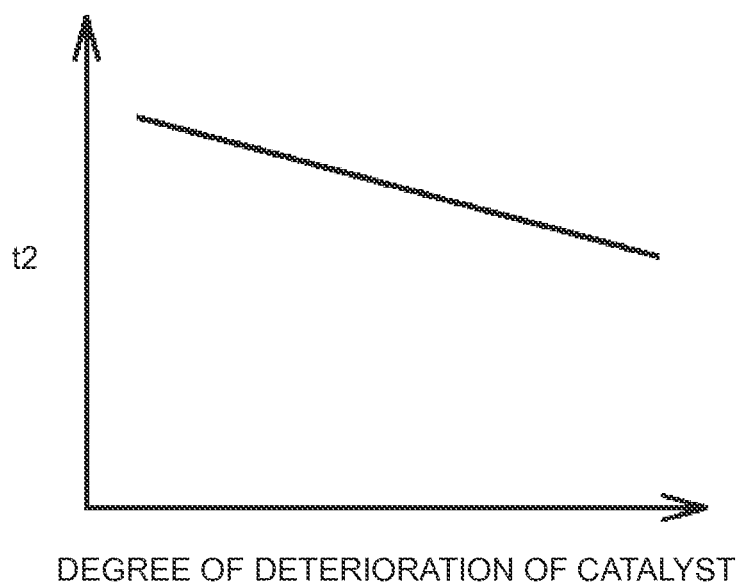
FIG. 9 is a table that indicates a relationship between the degree of deterioration of the catalyst and a specified value that are shown in FIG. 8.

The specified time period t2 may be a constant value or may be a value that is reduced in accordance with the degree of deterioration of the catalyst 32 as shown in FIG. 9. It is because the catalyst 32 is deteriorated in accordance with the use time or the like and also because the activation temperature of the catalyst 32 is increased in accordance with the degree of deterioration of the catalyst 32. For example, the control unit 25 stores a table that indicates a relationship between the total use time (that is, the degree of deterioration) of the catalyst 32 and the specified time period t2, and reads out the specified time period t2 that corresponds to the total use time of the catalyst 32 from the table.

If ti>t2 is satisfied in step S21, that is, if the catalyst 32 is cooled and the catalyst purification rate is not sufficiently high, the engine 1 is turned on in step S22, and the electric power generated in the motor M1 is fed to the outside. At this time, the speed of the engine 1 is set such that the catalyst bed temperature Tc becomes higher than the activation temperature of the catalyst 32 when the engine 1 is on for the specified time period t2. If it is determined in step S21 that ti>t2 is not satisfied, that is, if the sufficiently high purification rate of the catalyst 32 is secured, the electric power is fed to the outside from the motor M1, the electric storage device 3, or both of the motor M1 and the electric storage device 3 in step S23.

In this sixth embodiment, if the intermittent stop period ti exceeds the specified time period t2, that is, in the second case where the catalyst purification rate is not sufficiently high, the engine 1 is immediately turned on, and the catalyst 32 is heated. Thus, the amount of the exhaust emissions can be reduced.

Seventh Embodiment

Figure 10:
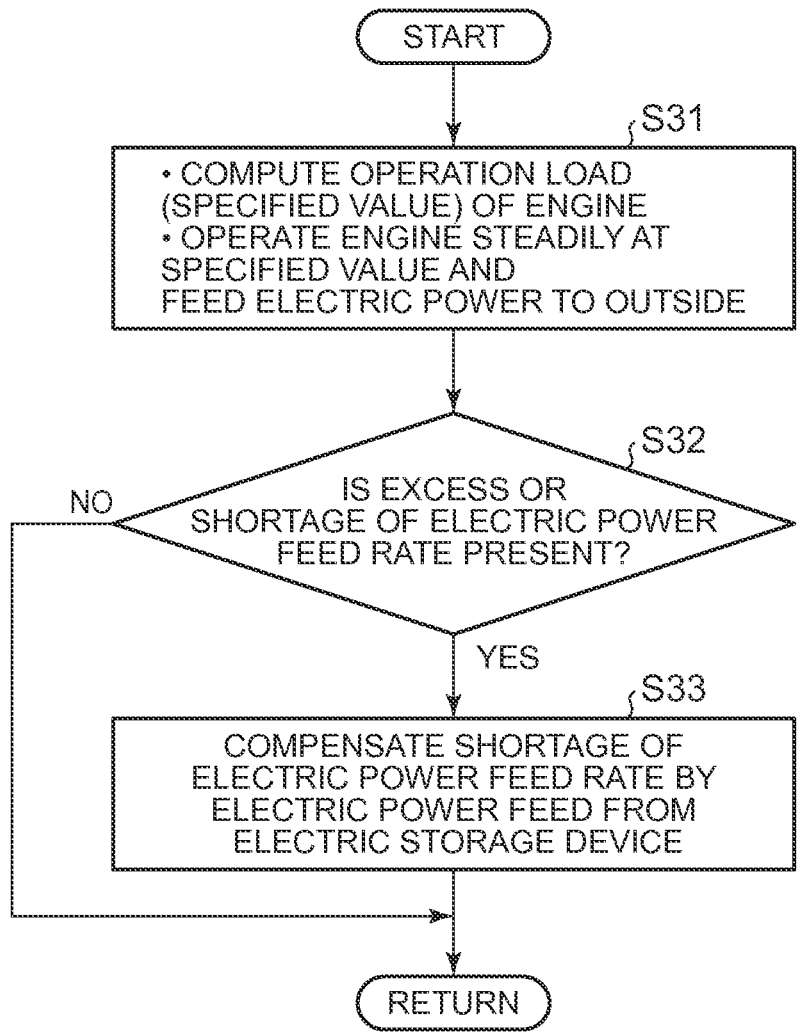
FIG. 10 is a flowchart for illustrating an operation of the hybrid vehicle according to a seventh embodiment of the invention in the outside electric power feed mode.

This seventh embodiment focuses on a fact that the amount of the exhaust emissions in increased in the third case where the load of the engine 1 fluctuates, so as to reduce the amount of the exhaust emissions. FIG. 10 is a flowchart for illustrating an operation of the hybrid vehicle according to the seventh embodiment of the invention in the outside electric power feed mode and is compared with FIG. 2.

In step S31 of FIG. 10, the control unit 25 computes an operation load (a specified value P1) of the engine 1, with which the purification rate of the catalyst 32 can sufficiently be increased, on the basis of the activation temperature, the degree of deterioration, or the like of the catalyst 32. Then, the control unit 25 causes the engine 1 to be operated steadily at the specified value P1 and supplies the electric power generated in the motor M1 to the outside of the vehicle.

The control unit 25 determines in step S32 whether an excess or shortage of an electric power feed rate P is present on the basis of electric power Pe generated in the engine 1 and electric power P that should be supplied to the outside of the vehicle. If the excess or shortage of the electric power feed rate P is present, the excess or shortage of the electric power feed rate P is compensated by the electric power feed from the electric storage device 3 in step S33. More specifically, if the electric power feed rate P becomes excessive, the excess is stored in the electric storage device 3. On the other hand, if the electric power feed rate P is deficit, the shortage is compensated by the supply from the electric storage device 3. After step S33 is executed, the process returns to step S31. If the excess or shortage of the electric power feed rate P is not present in step S32, the process returns to step S31.

Figure 11:
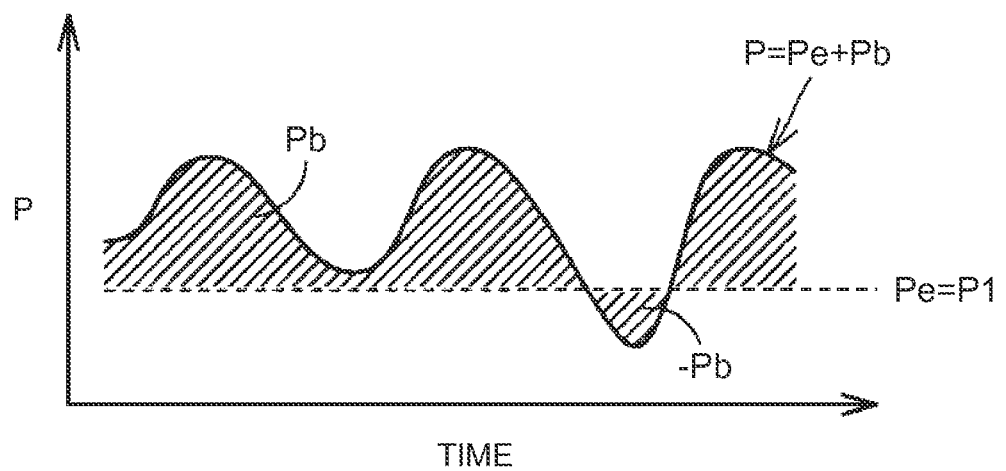
FIG. 11 is a time chart for exemplifying the operation of the hybrid vehicle shown in FIG. 10.

FIG. 11 is a time chart for exemplifying the electric power feed rate P in the outside electric power feed mode. In FIG. 11, the electric power Pe generated in the engine 1 is maintained at the specified value P1. In the case where the electric power P that is larger than the electric power Pe generated in the engine 1 is supplied, the shortage P−Pe is compensated by the supply from the electric storage device 3. Thus, P=Pe+Pb. On the contrary, in the case where the electric power P that is smaller than the electric power Pe generated in the engine 1 is supplied, the excess Pe−P is stored in the electric storage device 3. In this case, P=Pe−Pb.

In this seventh embodiment, the engine 1 is operated steadily with a constant load P1, and the excess or shortage of the electric power feed rate P is compensated by charging or discharging of the electric storage device 3. Thus, the amount of the exhaust emissions can be reduced.

Eighth Embodiment

Figure 12:
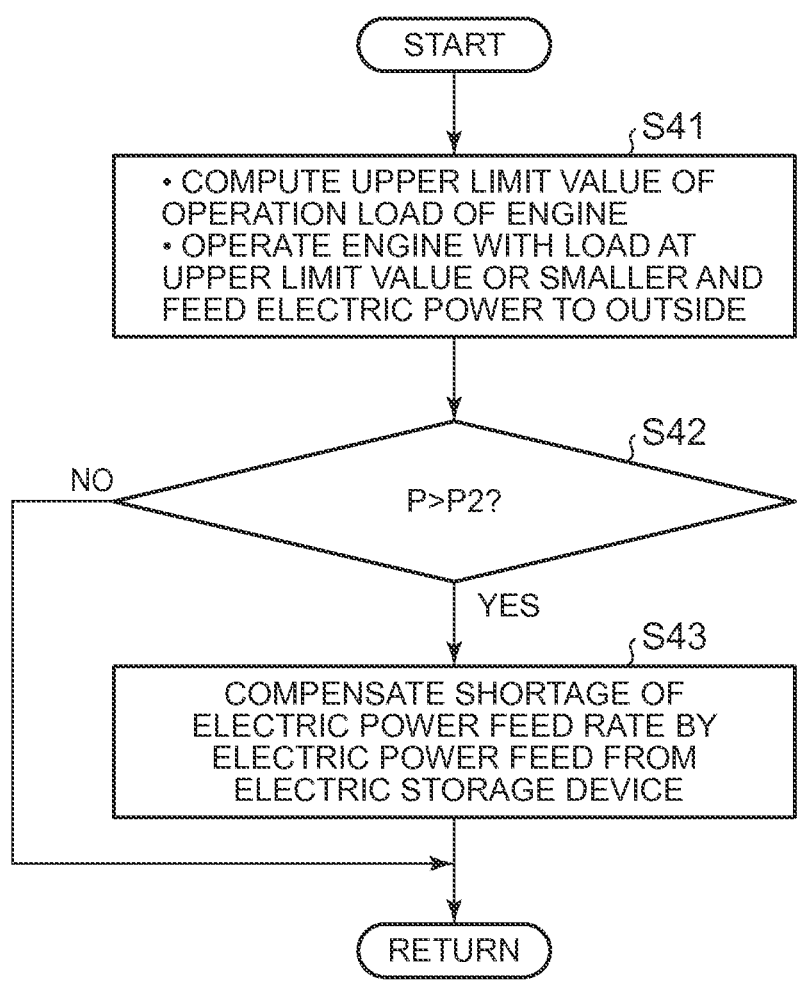
FIG. 12 is a flowchart for illustrating an operation of the hybrid vehicle according to an eighth embodiment of the invention in the outside electric power feed mode.

This eighth embodiment focuses on a fact that the amount of the exhaust emissions is increased in the fourth case where the load of the engine 1 exceeds an upper limit value P2, so as to reduce the amount of the exhaust emissions. FIG. 12 is a flowchart for illustrating an operation of the hybrid vehicle according to the eighth embodiment of the invention in the outside electric power feed mode an is compared with FIG. 2. In step S41 of FIG. 12, the control unit 25 computes the upper limit value P2 of the operation load of the engine 1, with which the exhaust emissions can be reduced, on the basis of the activation temperature, the degree of deterioration, or the like of the catalyst 32. Then, the control unit 25 causes the engine 1 to be operated with a load at the upper limit value P2 or smaller, and supplies the electric power generated in the motor M1 to the outside of the vehicle.

The control unit 25 determines in step S42 whether the electric power P, which should be supplied to the outside of the vehicle, is larger than the upper limit value P2 of the load of the engine 1. If it is determined in step S42 that P>P2 is satisfied, the shortage of the electric power P−P2 is compensated by the supply from the electric storage device 3 in step S43. After step S43 is executed, the process returns to step S41. If the shortage of the electric power feed rate P is not present in step S42, the process returns to step S41.

Figure 13:
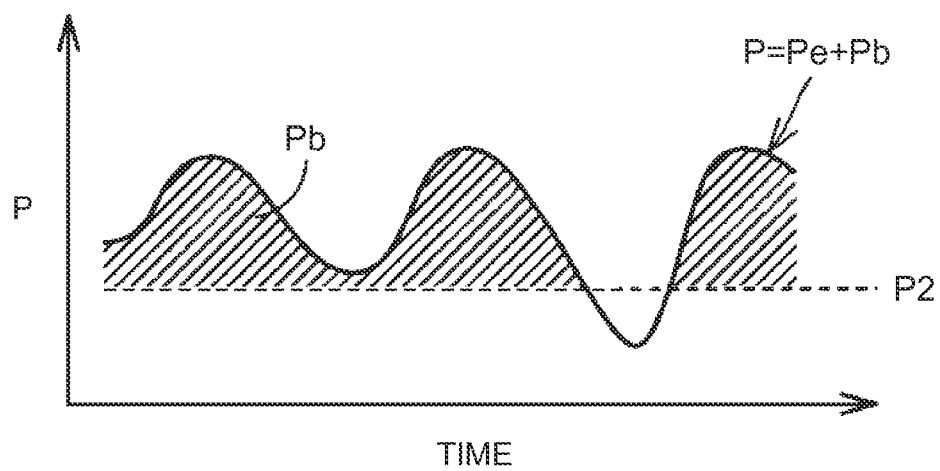
FIG. 13 is a time chart for exemplifying the operation of the hybrid vehicle shown in FIG. 12.

FIG. 13 is a time chart for exemplifying the electric power feed rate P in the outside electric power feed mode. In FIG. 13, the electric power Pe generated in the engine 1 is controlled to be equal to or smaller than the upper limit value P2. In the case where the electric power P that is larger than the upper limit value P2 of the electric power Pe of the engine 1 is supplied, the shortage P−Pe is compensated by the supply from the electric storage device 3. Thus, P=Pe+Pb. In the case where the electric power P that is smaller than the upper limit value P2 of the electric power Pe of the engine 1 is supplied, the electric power P is supplied from the engine 1. In this case, P=Pe.

In this eighth embodiment, the load of the engine 1 is suppressed to be equal to or smaller than the upper limit value P2. Thus, the amount of the exhaust emissions can be reduced.

It should be considered that the embodiments disclosed herein are illustrative in all aspects and not restrictive. The scope of the invention is indicated not by the above description but by the claims, and intends to include all changes that fall within the equivalent meaning and scope to the claims.

What is claimed is:

1. A hybrid vehicle comprising:
   an engine;
   a catalyst that purifies exhaust gas of the engine;
   a motor configured to be driven by the engine and generate electric power;
   an electric storage device configured to charge and discharge the electric power;
   an electric power feeder configured to supply at least one of the electric power generated by the motor or the electric power of the electric storage device to an outside of the hybrid vehicle; and
   an electronic control unit configured to
   a) control the engine and the electric power feeder, and
   b) determine whether or not a purification state of the exhaust gas of the engine satisfies a first condition,
   wherein when the electronic control unit determines that the purification state of the exhaust gas of the engine satisfies the first condition, supply the electric power from the electric power of the electric storage device, instead of from the electric power generated by the motor, to the outside of the hybrid vehicle via the electric power feeder, and when the electronic control unit determines that the purification state of the exhaust gas of the engine does not satisfy the first condition, supply the electric power from the electric power generated by the motor, instead of from the electric power of the electric storage device, to the outside of the hybrid vehicle via the electric power feeder.

2. The hybrid vehicle according to claim 1 wherein the electronic control unit is further configured to determine whether or not the purification state of the exhaust gas of the engine satisfies a second condition by detecting a temperature of the engine, and wherein the electronic control unit is further configured to,
   a) when the temperature of the engine does not satisfy the second condition, supply the electric power of the electric storage device to the outside of the hybrid vehicle while the engine is stopped, then actuate the engine, and supply the electric power generated by the motor to the outside of the hybrid vehicle, and
   b) when the temperature of the engine satisfies the second condition, actuate or stop the engine, and supply the electric power from at least one of the electric power generated by the motor and the electric power of the electric storage device to the outside of the hybrid vehicle.

3. The hybrid vehicle according to claim 2 wherein the electronic control unit is further configured to,
   a) when a temperature of a coolant of the engine is lower than a predetermined temperature, determine that the temperature of the engine does not satisfy the second condition, and
   b) when the temperature of the coolant of the engine is equal to or higher than the predetermined temperature, determine that the temperature of the engine satisfies the second condition.

4. The hybrid vehicle according to claim 2 wherein when the temperature of the engine does not satisfy the second condition, the electronic control unit is further configured to,
   a) when an elapsed time period since the electric power supply to the outside of the hybrid vehicle is initiated is shorter than a predetermined time period, supply the electric power of the electric storage device to the outside of the hybrid vehicle while the engine is stopped, and
   b) when the elapsed time period is equal to or longer than the predetermined time period, actuate the engine and supply the electric power generated by the motor to the outside of the hybrid vehicle.

5. The hybrid vehicle according to claim 2 wherein when the temperature of the engine does not satisfy the second condition, the electronic control unit is further configured to,
   a) when a state of charge of the electric storage device is higher than a predetermined state of charge, supply the electric power of the electric storage device to the outside of the hybrid vehicle while the engine is stopped, and
   b) when the state of charge of the electric storage device is equal to or lower than the predetermined state of charge, actuate the engine and supply the electric power generated by the motor to the outside of the hybrid vehicle.

6. The hybrid vehicle according to claim 1 wherein the electronic control unit is further configured to determine whether or not the purification state of the exhaust gas of the engine satisfies a third condition by determining whether or not a purification rate of the catalyst is lower than a threshold, and wherein the electronic control unit is further configured to,
   a) when the purification rate of the catalyst is lower than the threshold, supply the electric power of the electric storage device to the outside of the hybrid vehicle while the engine is stopped, then actuate the engine, and supply the electric power generated by the motor to the outside of the hybrid vehicle, and
   b) when the purification rate of the catalyst is equal to or exceeds the threshold, actuate or stop the engine, and supply the electric power from at least one of the electric power generated by the motor and the electric power of the electric storage device to the outside of the hybrid vehicle.

7. The hybrid vehicle according to claim 6 wherein the electronic control unit is further configured to,
   a) when a temperature of the catalyst is lower than a predetermined temperature, determine that the purification rate of the catalyst is lower than the threshold, and
   b) when the temperature of the catalyst is equal to or higher than the predetermined temperature, determine that the purification rate of the catalyst is equal to or exceeds the threshold.

8. The hybrid vehicle according to claim 7 wherein the electronic control unit is further configured to change the predetermined temperature such that the predetermined temperature is increased as the catalyst deteriorates.

9. The hybrid vehicle according to claim 6 wherein when the purification rate of the catalyst is lower than the threshold, the electronic control unit is further configured to,
   a) when an elapsed time period since the electric power supply to the outside of the vehicle is initiated is shorter than a predetermined time period, supply the electric power of the electric storage device to the outside of the hybrid vehicle while the engine is stopped, and
   b) when the elapsed time period is equal to or longer than the predetermined time period, actuate the engine and supply the electric power generated by the motor to the outside of the hybrid vehicle.

10. The hybrid vehicle according to claim 6 wherein when the purification rate of the catalyst is lower than the threshold, the electronic control unit is further configured to,
    a) when a state of charge of the electric storage device is higher than a predetermined state of charge, supply the electric power of the electric storage device to the outside of the hybrid vehicle while the engine is stopped, and
    b) when the state of charge of the electric storage device is equal to or lower than the predetermined state of charge, actuate the engine and supply the electric power generated by the motor to the outside of the hybrid vehicle.

11. The hybrid vehicle according to claim 1 wherein the electronic control unit is further configured to, determine whether a temperature is lower than a predetermined temperature, and,
    a) when the temperature of the catalyst is lower than the predetermined temperature, actuate the engine and supply the electric power generated by the motor to the outside of the hybrid vehicle, and
    b) when the temperature of the catalyst is equal to or higher than the predetermined temperature, actuate or stop the engine and supply the at least one of the electric power generated by the motor or the electric power of the electric storage device to the outside of the hybrid vehicle.

12. The hybrid vehicle according to claim 11 wherein the electronic control unit is further configured to change the predetermined temperature such that the predetermined temperature is increased as the catalyst deteriorates.

13. The hybrid vehicle according to claim 1 wherein the electronic control unit is further configured to determine whether an intermittent stop period of the engine is longer than a predetermined time period, and
    a) when the intermittent stop period of the engine is longer than the predetermined time period, actuate the engine and supply the electric power generated by the motor to the outside of the hybrid vehicle, and b) when the intermittent stop period of the engine is equal to or shorter than the predetermined time period, actuate or stop the engine, and supply the electric power from at least one of the electric power generated by the motor and the electric power of the electric storage device to the outside of the hybrid vehicle.

14. The hybrid vehicle according to claim 13 wherein the electronic control unit is further configured to change the predetermined time period such that the predetermined time period is reduced as the catalyst deteriorates.

* * * * *